(12) United States Patent
Tam et al.

(10) Patent No.: US 11,561,385 B2
(45) Date of Patent: Jan. 24, 2023

(54) SYSTEMS AND METHODS FOR SAMPLE IMAGE CAPTURE USING INTEGRATED CONTROL

(71) Applicant: LIFE TECHNOLOGIES CORPORATION, Carlsbad, CA (US)

(72) Inventors: Terence Tak-Shing Tam, Redmond, WA (US); Christopher Martin, Bothell, WA (US); Frank Metting, Bothell, WA (US); Jason Mecham, Snohomish, WA (US); Robert Dain, Lynnwood, WA (US); Larry Rystrom, Mill Creek, WA (US); Paul Adrian Boeschoten, Redmond, CA (US); Steven W. Lytle, Mill Creek, WA (US)

(*) Notice: Subject to any disclaimer, the term of this patent is extended or adjusted under 35 U.S.C. 154(b) by 7 days.

(21) Appl. No.: 16/175,550

(22) Filed: Oct. 30, 2018

(65) Prior Publication Data

US 2019/0170996 A1    Jun. 6, 2019

Related U.S. Application Data

(63) Continuation of application No. 13/894,185, filed on May 14, 2013, now abandoned.

(51) Int. Cl.
G02B 21/36      (2006.01)

(52) U.S. Cl.
CPC .................. *G02B 21/365* (2013.01)

(58) Field of Classification Search
CPC .................. G02B 21/365; G01N 21/6428
(Continued)

(56) References Cited

U.S. PATENT DOCUMENTS 4,907,158 A     3/1990  Kettler et al.
8,179,597 B2 *  5/2012  Namba .............. G02B 21/0088
                                                  359/383
(Continued)

FOREIGN PATENT DOCUMENTS

CN    1537229    10/2004
EP    2213722     8/2010
(Continued)

OTHER PUBLICATIONS

Okolab, "Bold Line Stage Incubator Brochure", 2012, pp. 1-4.
(Continued)

*Primary Examiner* — John W Miller
*Assistant Examiner* — Omer Khalid
(74) *Attorney, Agent, or Firm* — Workman Nydegger; Logan Christenson; John Guynn

(57) ABSTRACT

Embodiments relate to systems and methods for sample image capture using integrated control. A digital microscope or other imaging device can be associated with a sample chamber containing cell, tissue, or other sample material. The chamber can be configured to operate using a variety of environmental variables, including gas concentration, temperature, humidity, and others. The imaging device can be configured to operate using a variety of imaging variables, including magnification, focal length, illumination, and others. A central system control module can be used to configure the settings of those hardware elements, as well as others, to set up and carry out an image capture event. The system control module can be operated to control the physical, optical, chemical, and/or other parameters of the overall imaging environment from one central control point. The variables used to produce the image capture can be configured to dynamically variable during the media capture event.

18 Claims, 7 Drawing Sheets

(58) Field of Classification Search
USPC .......................... 348/79; 435/288.7; 700/108
See application file for complete search history.

(56) References Cited

U.S. PATENT DOCUMENTS

| | | |
|---|---|---|
| 2004/0235205 A1 | 11/2004 | Levy et al. |
| 2005/0282268 A1* | 12/2005 | Kagayama ............. C12M 23/50 |
| | | 359/398 |
| 2008/0071407 A1 | 3/2008 | Schaffler et al. |
| 2008/0291534 A1 | 11/2008 | Okugawa |
| 2011/0002677 A1* | 1/2011 | Cochran ................ H05B 3/148 |
| | | 392/407 |
| 2011/0051232 A1 | 3/2011 | Steinborn et al. |

FOREIGN PATENT DOCUMENTS

| | | |
|---|---|---|
| JP | 2006011415 | 1/2006 |
| JP | 2008092957 | 4/2008 |
| JP | 2012163767 | 8/2012 |
| WO | WO-1998/020108 | 5/1998 |
| WO | WO-2009/127336 | 10/2009 |

OTHER PUBLICATIONS

PCT/US2014/037556, "International Preliminary Report on Patentability mailed", dated Nov. 26, 2015, 7 pgs.
PCT/US2014/037556, "International Search Report mailed", dated Aug. 21, 2014, 4 pgs.
TOKAI HIT®, "Stage Top® Incubator Brochure", 2011, pp. 1-16.

\* cited by examiner

SYSTEMS AND METHODS FOR SAMPLE IMAGE CAPTURE USING INTEGRATED CONTROL

CROSS-REFERENCE TO RELATED APPLICATIONS

This application is a continuation of co-pending U.S. patent application Ser. No. 13/894,185, filed May 14, 2013, which disclosure is herein incorporated by reference in its entirety.

FIELD

The present teachings relate to systems and methods for sample image capture using integrated control, and more particularly, to platforms and techniques for an integrated digital microscopy platform which controls the configuration of sample chamber, media capture, and other operational settings from a single and integrated control point.

BACKGROUND

In the field of microscopy for medical, research, and other applications, it has been known to use digital imaging to capture video of incubated samples contained within a sample chamber. In those types of applications and others, an electronically controlled microscope has been coupled to various control logic to adjust focal length, depth, illumination parameters, and other settings to control the exposures being taken by the video device.

In those types of applications, samples are typically housed for imaging by the imaging device in a sample or environmental chamber. The chamber may enclose a plate containing medical samples, such as tissue or cell cultures used for various diagnostic purposes. The chamber can include one or more environmental variables that can be set for the duration of an exposure event. Those variables can include conditions such as the amount or concentration of environmental gases present in the chamber, such as carbon dioxide or oxygen. Those variables can likewise include conditions such as the temperature, humidity, and other physical conditions of the chamber. The growth rate or other characteristics of the sample in the chamber can therefore be imaged and examined, based on those sets of conditions or others. The positioning of that chamber and the setting of environmental conditions within that chamber However, in known digital microscopy platforms, the settings of the environmental chamber, the settings of the video or other media captured by the imaging device, and the settings of the imaging device itself are controlled by separate control logic, manufactured by separate vendors and not provided with interoperable features. Thus, users who need to prepare an exposure event, arrange the video or other capture of that event, conduct that controlled exposure and record the resulting media for future review, are forced to interact with several independent and possibly incompatible systems. Moreover, even once the various configuration settings, event timing, and related operational details are prepared, conventional digital microscopy platforms are locked into performing the exposure or experiment based on those settings, with no possibility of adjusting or altering those settings while the exposure event is taking place.

It may be desirable to provide methods and systems for sample image capture using integrated control, in which a digital imaging platform can be controlled and operated from a single control point in a comprehensive fashion, and during which various environmental conditions in the sample chamber can be dynamically changed during the exposure run.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for sample image capture using integrated control. More particularly, embodiments relate to platforms and techniques for the digital imaging of incubated samples using integrated control, which can include dynamically varying environmental controls.

Reference will now be made in detail to exemplary embodiments of the present teachings, which are illustrated in the accompanying drawings. Where possible the same reference numbers will be used throughout the drawings to refer to the same or like parts.

Figure 1:
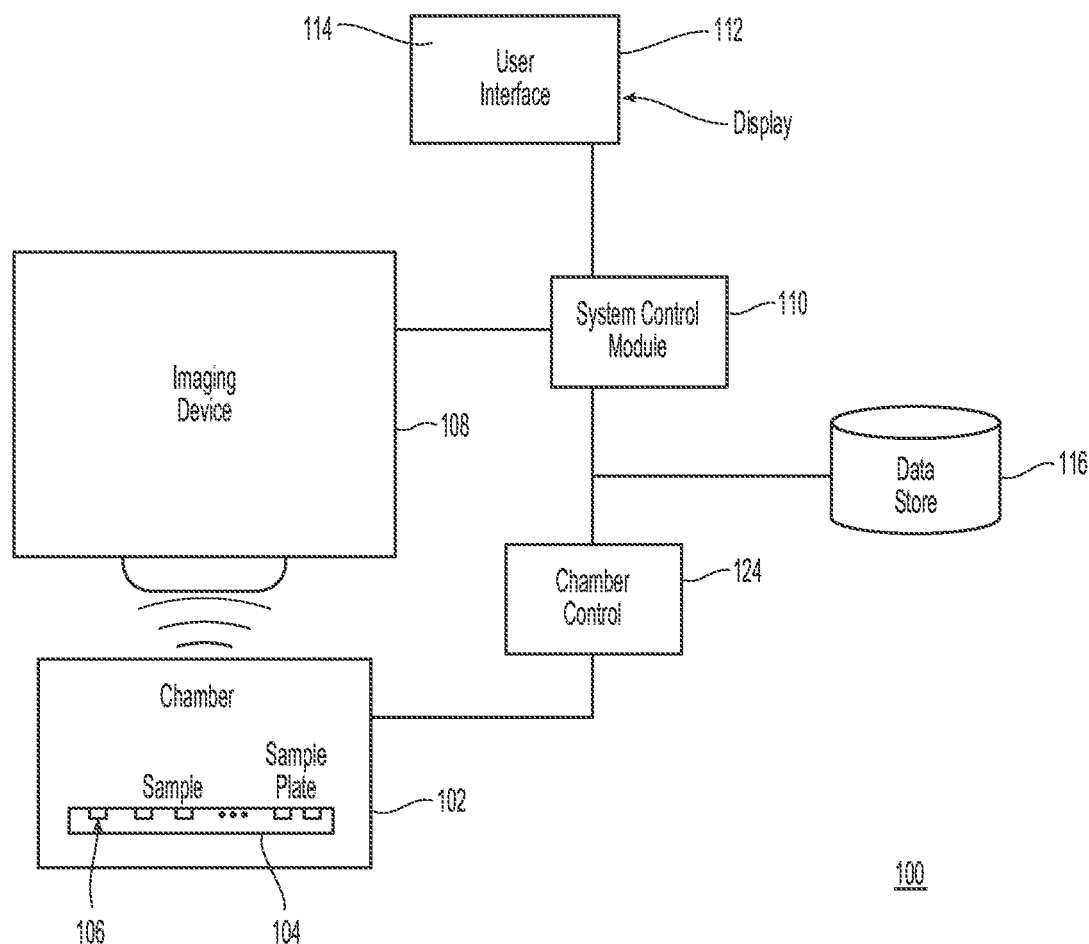
FIG. 1 illustrates an overall environment, including imaging hardware, which can be used in systems and methods for sample image capture using integrated control, according to various embodiments.

FIG. 1 illustrates an overall environment 100 in which systems and methods for sample image capture using integrated control can operate, according to aspects. In aspects as shown, the overall environment 100 can include an imaging device 108, such as a microscope equipped with a digital sensor. The digital sensor can be or include a video camera, a still-image camera, and/or other type of sensor or device. The digital sensor of the imaging device 108 can be equipped or configured to detect images using visible, infrared, and/or other light frequencies, wavelengths, or ranges. The imaging device 108 can, in general, be configured to take images of the interior of a chamber 102. The chamber 102 can contain a set of samples 106 for instance located in a sample plate 104. In implementations, the imaging device 108 can incorporate or be connected with a source of illumination, such as laser or other illumination, to allow irradiation of the set of samples 106. The set of samples 106 can be or include, for instance cells, tissues, fluids, or other biological materials or specimens. In aspects, the imaging device 108 can also be configured or used to image non-biological samples or specimens. In implementations, the chamber 102 can be positionable using a stepper motor or other apparatus to move the chamber 102, or can be fixed in place with imaging elements of the imaging device 108 being positionable to image different portions of the sample plate 104. In implementations as shown, the chamber 102 can be connected to a chamber control 124, which can control he introduction of gases, regulation of temperatures, and other conditions of the chamber 102 using valves, supply lines, heating elements, and/or other hardware. The chamber control 124 can be or include a computer, embedded controller, and/or other hardware, software, and/or logic, and can be connected to an overall system control module 110, and other resources of the environment, through various network connections.

According to aspects, and as also shown, the imaging device 108 can likewise be connected to the system control module 110, which can be configured to interact with the imaging device 108 as well as other resources including a user interface 114 and a data store 116, to carry out imagining operations on the set of samples 106 or other objects of interest. In aspects, the system control module 110 can be or include hardware, software, and/or other resources to control the imaging device 108 and all associated operations, in an integrated manner. The system control module 110 can, in embodiments, be or include a desktop, laptop, and/or other computer provisioned with applications, services, and/or other logic to control the imaging device 108 and other elements of the overall environment 100. In implementations, the system control module 110 can reside in one local computer, such as a laptop or desktop computer. In other implementations, the system control module 110 can be hosted in one or more remote computers, such as computers connected via the Internet and/or other public or private networks. In aspects, the system control module 110 can likewise be implemented, in whole or part, in a cloud-based network.

The chamber 102, system control module 110, data store 116, display 112, and/or other elements can, in implementations be linked via various connections, such as a universal serial bus (US) connection or connections, in a local area network (LAN) such as an Ethernet LAN, through the Internet, and/or through other networks, channels, or connections. In implementations, any one or more of those network elements, nodes, or resources can again be hosted locally or remotely.

The user interface 114 can be presented on a display 112, such as a light emitting diode (LED) or other computer display. The user interface 114 can present to the user or operator of the imaging device 108 and environment 100 a set or series of configuration settings and operational controls, to allow the user or operator to set up, schedule, and execute any desired incubation or treatment of the set of samples 106, while capturing video, still-image, or other media representations of the development of the set of samples 106 under the configured imaging and environmental variables. The resulting video or other data or files can be stored to a data store 116, which can be or include a local or remote hard drive or other type of data storage.

When the video capture event is complete, the system control module 110 can further be used to review the captured media via the user interface 114, such as to view, rewind, speed up, step through or otherwise observe selected portions of the video or other files. As noted, all of the various operations including setting the environmental controls on the chamber 102, controlling the optical, exposure, or other imaging variables of the imaging device 108, storing captured media to the data store 116, and retrieving and playing the captured media on the display 112 or other output, can be controlled via the system control module 110, without a necessity for other control logic, software, or control points.

Figure 2:
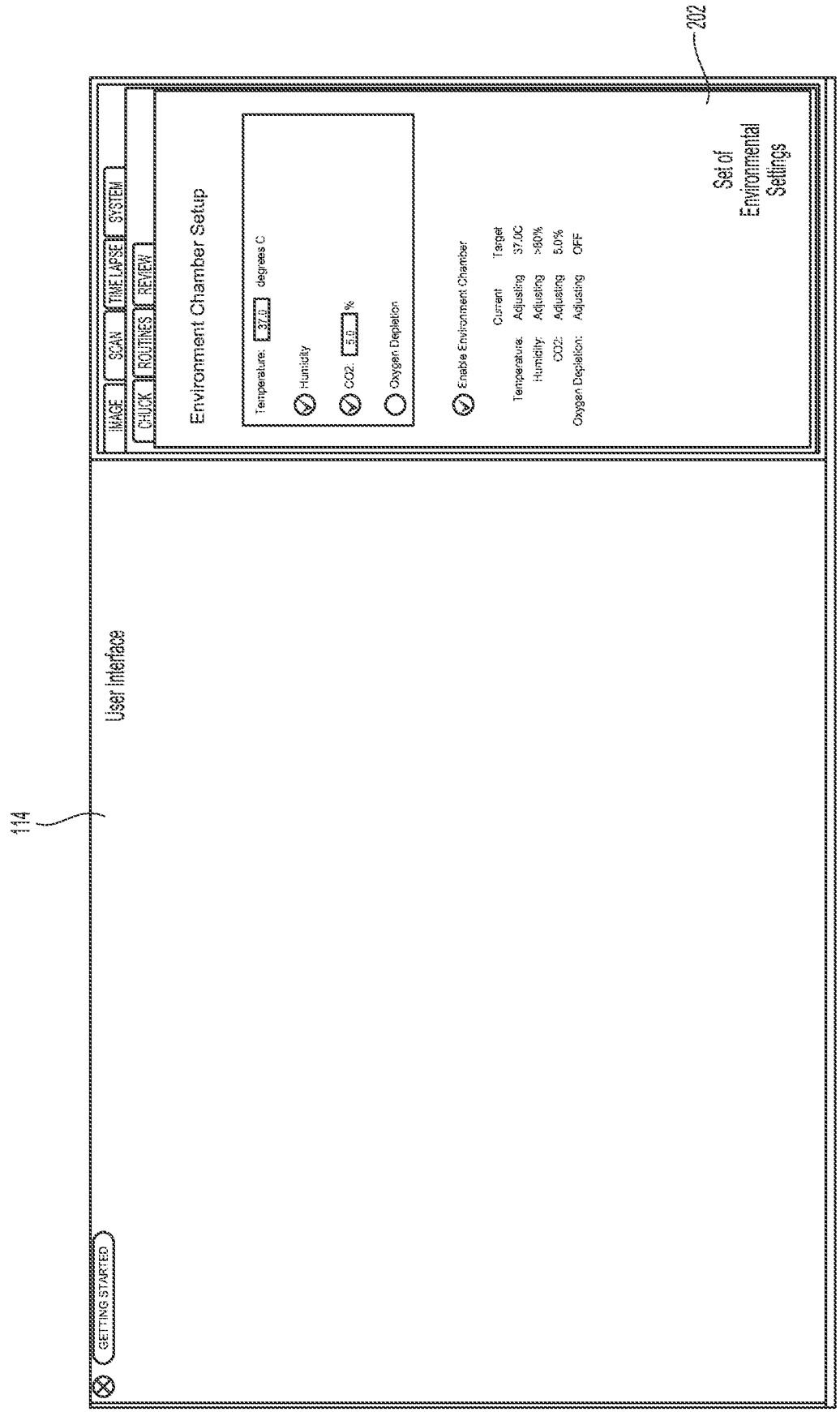
FIG. 2 illustrates a user interface and various imaging, environmental, and other controls, according to various aspects.

More specifically and as for instance illustrated in FIG. 2, the user can operate a set of environmental controls 202 via the user interface 114 to set, edit, adjust, and/or otherwise configure the physical conditions within the chamber 102. Those can include, but are not limited to, variables such as internal temperature of the chamber 102, the humidity level, carbon dioxide concentration level, oxygen depletion state, pressure, and/or other variables or parameters. Those physical conditions in the chamber 102 can be controlled or manipulated using vacuum lines or connections, gas sources, heating or cooling elements, and/or other attachments or hardware. In implementations, the set of environmental controls 202 can also include or regulate the introduction of reagents, growth factors, and/or other adjuvants that may be used to stimulate or modify the growth of the sample 106. Those conditions and hardware can, once more, be connected to and directly or indirectly controlled via the chamber control 124, which again can communicate with the system control module 110 to receive configuration settings and other instructions or data.

Figure 3:
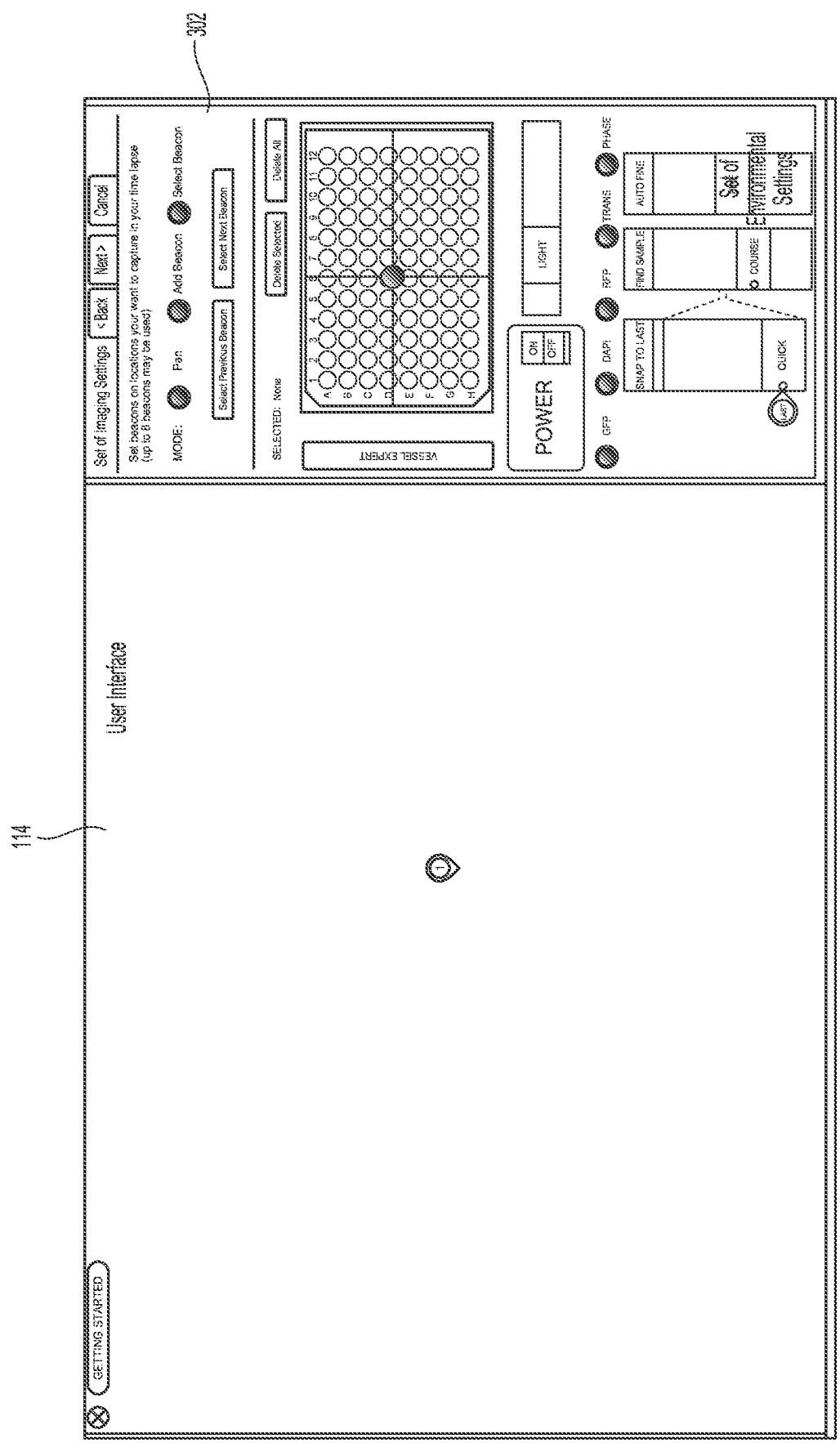
FIG. 3 illustrates a user interface and various imaging, environmental, and other controls, according to various aspects in further regards.

In addition to the control of environmental variables within chamber 102, the system control module 110 can control additional features of the operation of the imaging device 108, including, as shown in FIG. 3, a set of exposure controls 302. The set of exposure controls 302 can include, as illustrated, a specification of the position of the sample plate 104, the type of illumination to be applied to the sample plate 104, imaging modes such as pan or zoom, and others. Illumination variables controlled by the system control module 110 can include an indication of the type of fluorescent beacon being used in the imaging of the sample 106, as well as a slider bar (shown) or other control for the intensity of the light, coarse and fine focus or auto adjust controls, and others. Positioning of the imaging device 108 to focus on individual sample wells in sample plate 104 can also be performed. It will be appreciated that other controls can be used in the set of exposure controls 302.

Figure 4:
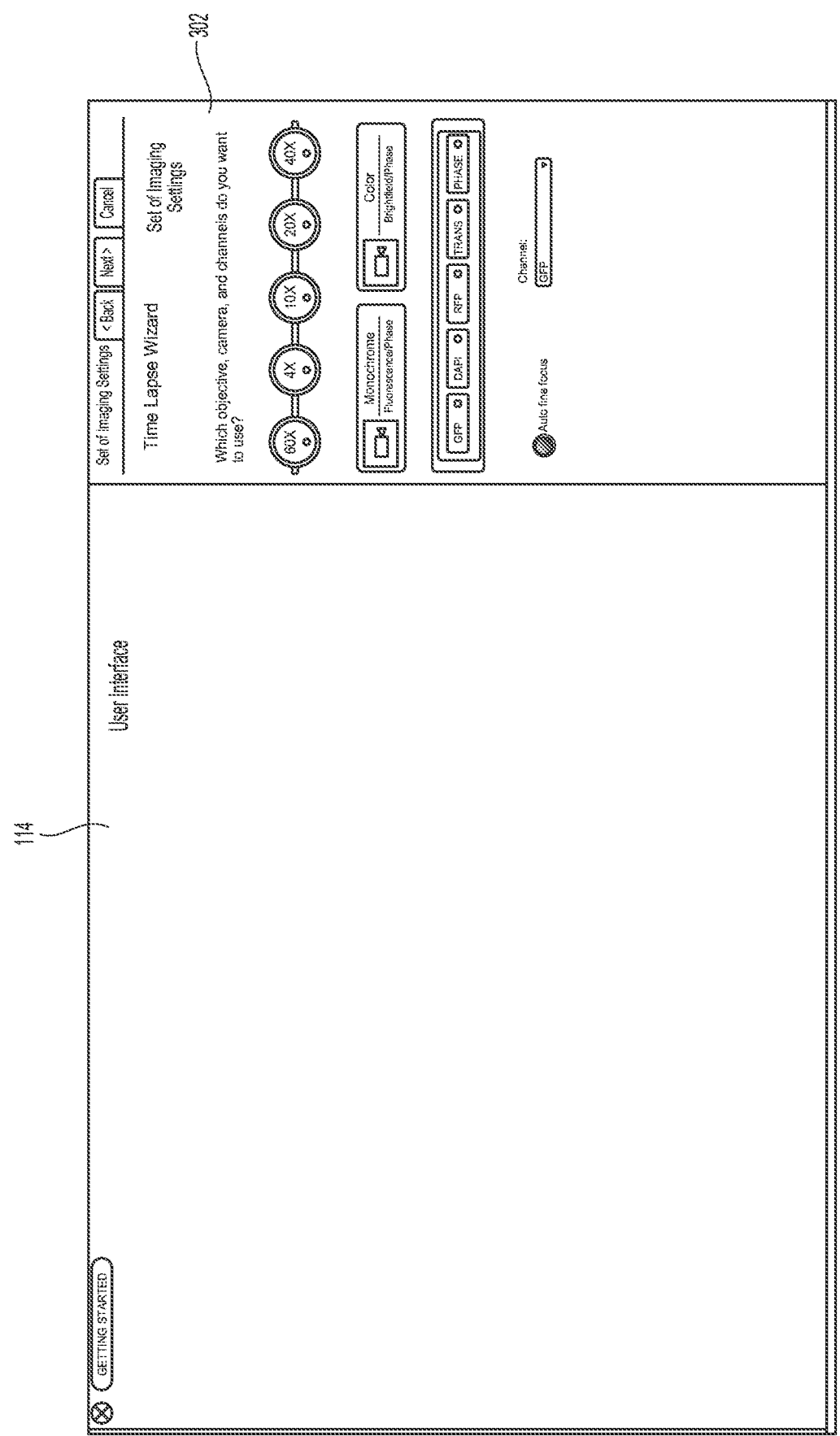
FIG. 4 illustrates a user interface and various imaging, environmental, and other controls, according to various aspects in further regards.
Figure 5:
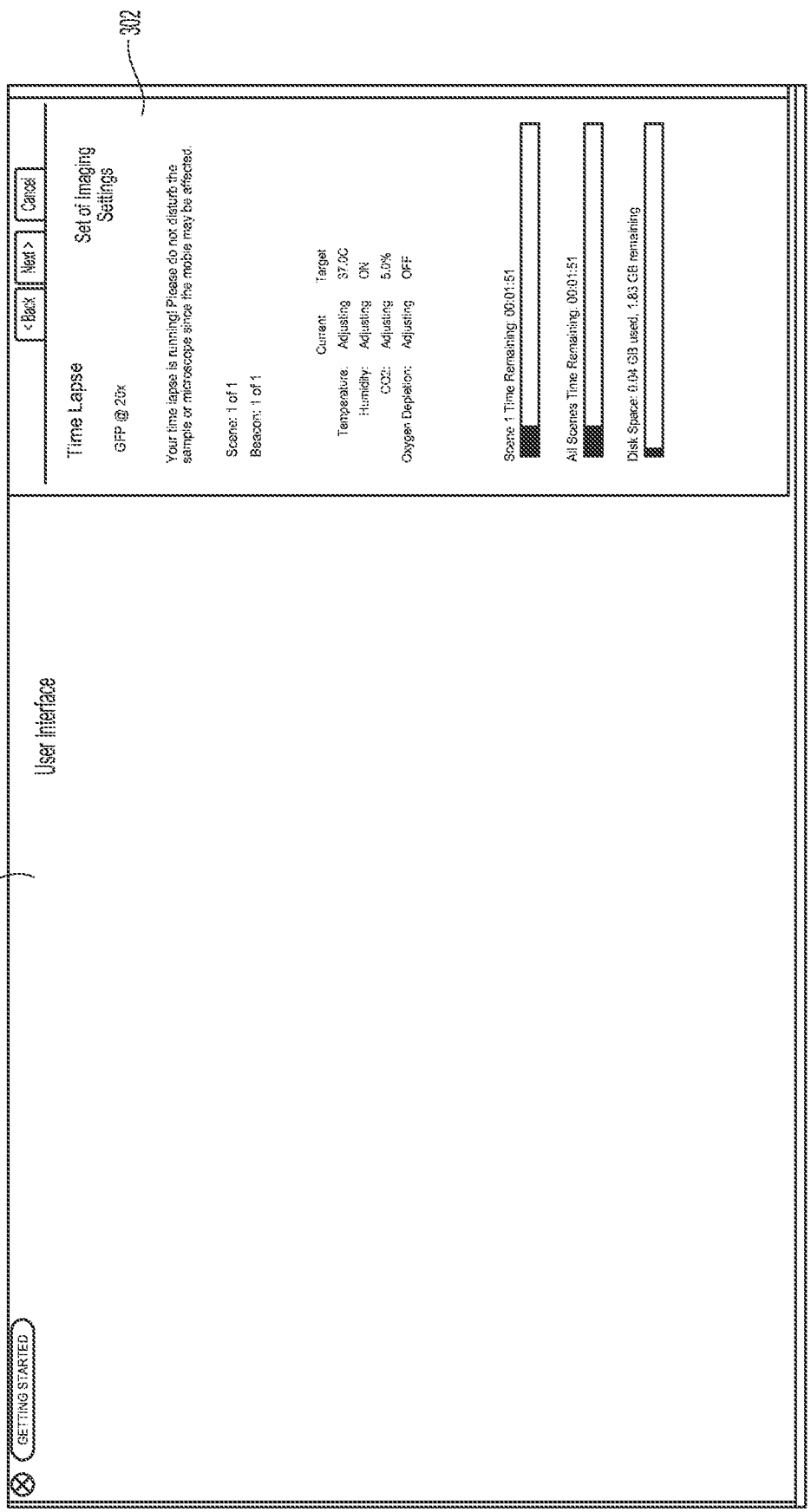
FIG. 5 illustrates a user interface and various imaging, environmental, and other controls, according to various aspects in further regards.

The set of exposure controls 302 can, as illustrated in FIG. 4, likewise including additional imaging settings such as magnification levels, monochrome and color settings (including e.g. brightfield and phase settings, additional beacon settings, transparency, fine focus, and/or other variables or settings. The set if exposure controls 302 can, still further, and as illustrated in FIG. 5, include controls or settings related to the time duration, scheduling, and execution of the media capture event controlled by the system control module 110. In implementations as shown, the set of exposure controls 302 in this regard can include settings for the identification of scenes, beacons, counters reflecting remaining time of exposure, dashboards or other displays for the environmental settings 302 in the chamber 102 contemporaneous with the image capture, and/or other time, scheduling, or other controls. It may be noted, again, that the set of environmental controls 302 can be set, configured, or programmed to dynamically change during the course of an image capture event. For instance, the imaging device 108 can be configured using the system control module 110 to take video image streams of the set of samples 106 over a 1 hour, 24-hour, or other period, during which temperature increases and/or decreases, carbon dioxide or oxygen concentrations increase and/or decrease, humidity levels increase and/or decrease, illumination wavelengths and/or intensities increase and/or decrease, or any other configuration setting controlled by system control module 110 is adjusted, altered, updated, and/or otherwise dynamically changed.

It may be further noted that the set of exposure controls 302, the set of environmental controls 202, and other information can be embedded or recorded in the media captured and stored in the media capture event. For instance, when the media consists of digital video, those configuration settings can be recorded in a textual strip located at the bottom of the video frames, and/or in other locations. The same information can be recorded in instances where the media consists of digital still photographs, or other media formats or types.

Figure 6:
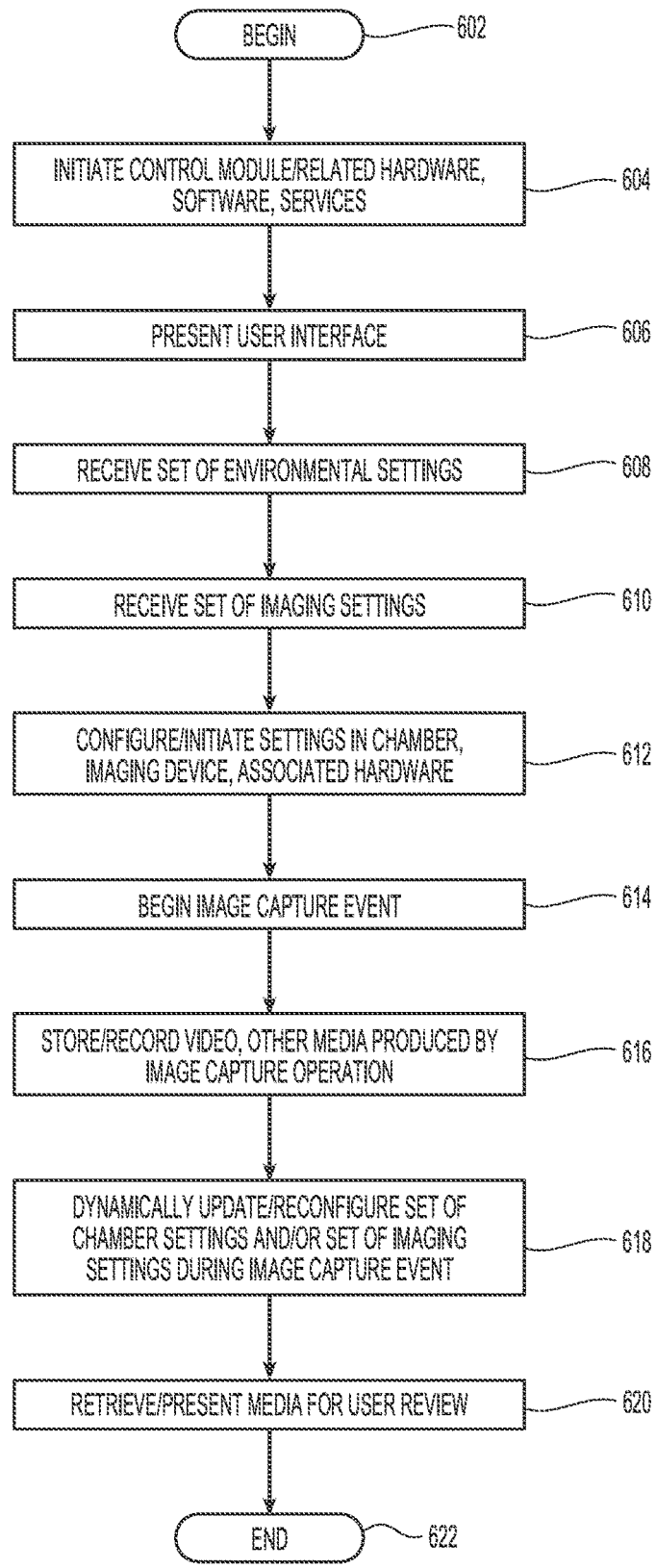
FIG. 6 illustrates a flowchart of processing that can be used in sample image capture using integrated control, according to various embodiments.

FIG. 6 illustrates a flowchart of optical, configuration, and other processing that can be performed in systems and methods for sample image capture using integrated control, according to aspects. In 602, processing can begin. In 604, a user can initiate the system control module 110 and/or other related hardware, software, or services used in conjunction with the imaging device 108. That initiation can take place by the manual starting of an application on a computer or other control platform, and/or can be initiated automatically by programmed control, for instance based on predetermined schedule or triggering events. In 606, the system control module 110 can generate and/or present the user interface 114 to the user, such as by displaying a graphical user interface (GUI) on the display 112. In 608, the system control module 110 can receive the set of environmental settings 202, for instance settings provided by manual user input via the user interface 114. In implementations, the set of environmental settings 202 can include default or initial settings. In 610, the system control module 110 can receive the set of imaging settings 302, which can again be received in the form of user input via the user interface 114, and/or which can be retrieved from a data store for default or other purposes.

In 612, the system control module 110 can configure, provisional, install, and/or otherwise initiate the set of environmental settings 202, the set of imaging settings 302, and/or other parameters needed for the operation of the imaging device 108. In aspects, the system control module 110 can transmit those settings to the various elements of the imaging device 108 and environment 100 via messages over a USB connection, over a LAN, over the Internet, over a wireless data connection, and/or via other channels or connections. In implementations, some or all of the transmitted configuration data can be stored at local points within the imaging device 108, the chamber 102, and/or other elements or nodes of the environment 100, as well as being stored in the system control module 110.

In 614, the system control module 110 can begin an image capture event, such as the initiation of the recording of a video stream which images the set of samples 106 in the chamber 102. According to aspects, the beginning of the image capture event can bet set to take place at a predetermined, programmed, and/or event-triggered time, and/or can be manually initiated by a user operating the system control module 110. In 616, the system control module 110 can store, encode, and/or otherwise record the captured video or other imaging data, for instance to the data store 116. The captured imaging data can for instance be stored or recorded in any known media file or format, including, simply for example, the audio video interleave (avi) format, the Motion Pictures Experts Group 4 (MPEG-4) format, the Windows™ Media Video (wmv) format, and/or others.

In 618, the system control module 110 can dynamically update and/or reconfigured the set of environmental settings 202, the set of imaging settings 302, and/or other configuration settings or values during the ongoing image capture event. For example, the selected illumination type or intensity can be changed at programmed times during the capturing of a video stream, and/or other changes to the overall configuration of the imaging device 108 and environment 100 can be made. In 620, the captured media from a media capture event can be retrieved and/or presented to the user for review using the system control module 110. In aspects, the retrieval and viewing of video or other data can be performed at the same time that a media capture event is taking place, such as by using additional screens to view earlier points in the video file while new imaging data is being taken. Retrieval and review can also or instead be done after the completion of a media capture event. It may be noted that once video and/or other data is captured, that media can be viewed by applications or software other than the system control module 110. In 622, processing can repeat, return to a prior processing point, jump to a further processing point, or end.

Figure 7:
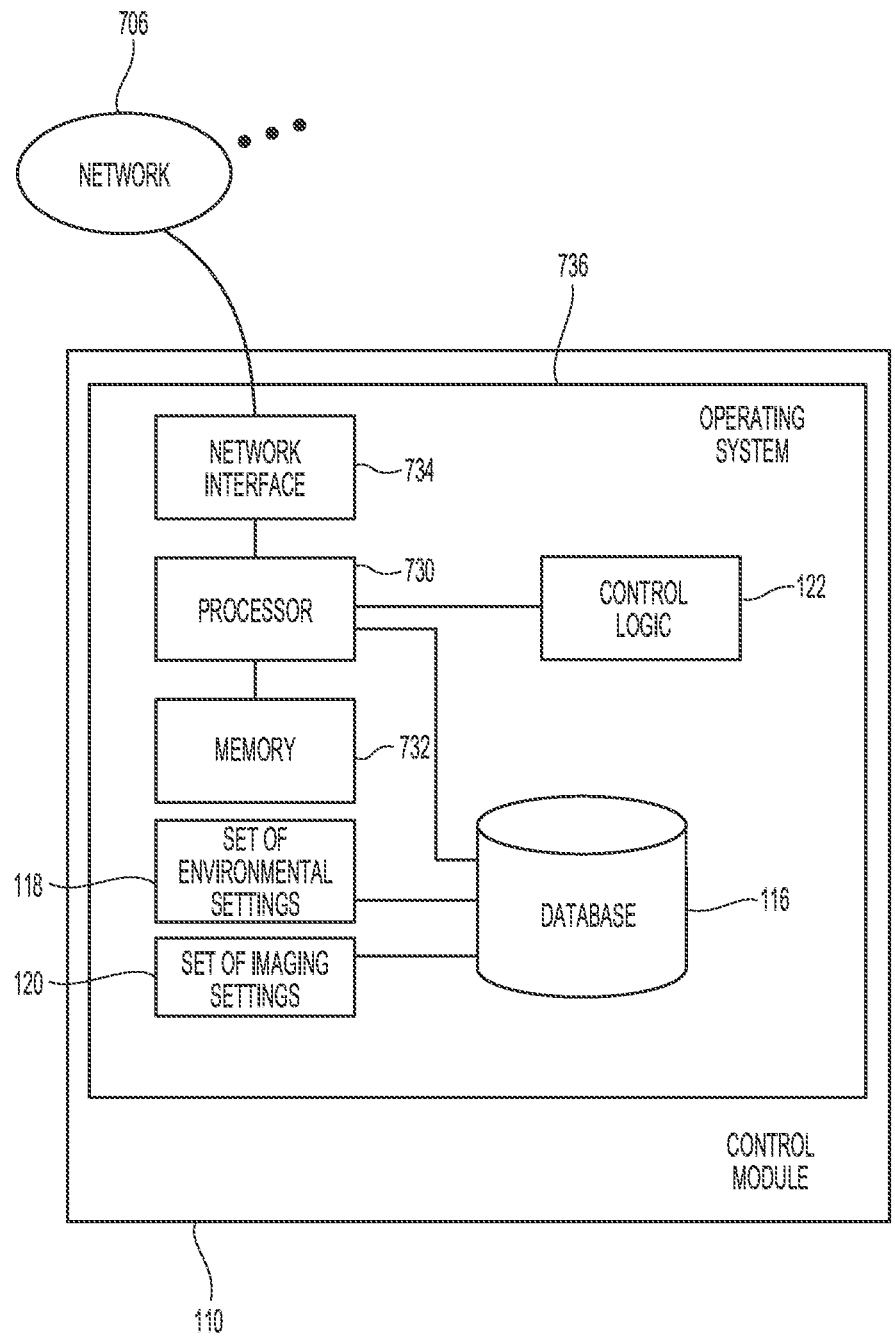
FIG. 7 illustrates exemplary hardware, software, and other resources that can be used in sample image capture using integrated control, according to various embodiments.

FIG. 7 illustrates various hardware, software, and other resources that can be used in implementations of sample image capture using integrated control, according to embodiments. In embodiments as shown, the system control module 110 can comprise a platform including processor 730 communicating with memory 732, such as electronic random access memory, operating under control of or in conjunction with an operating system 736. The processor 730 in embodiments can be incorporated in one or more servers, clusters, and/or other computers or hardware resources, and/or can be implemented using cloud-based resources. The operating system 736 can be, for example, a distribution of the Windows™ operating system, Linux™ operating system, the Unix™ operating system, or other open-source or proprietary operating system or platform. The processor 730 can communicate with the data store 116, such as a database stored on a local hard drive or drive array, to access or store any of the configuration data described herein, including as shown the set of environmental settings 202, the set of imagining settings 302, video and/or other captured imaging media (along with subsets of selections thereof), as well as other content, media, or other data.

The processor 730 can in turn communicate with a network interface 734, such as an Ethernet or wireless data connection, which in turn communicates with the one or more networks 706, such as the Internet or other public or private networks. The processor 730 can, in general, be programmed or configured to execute control logic 122 to control various processing operations described herein, including to generate control settings for the imaging device 108 and other hardware used in the environment 100. The control logic 122 can, in implementations, be or include applications, utilities, routines, and/or other software configured to communicate with the imaging device 108 and other resources or elements in the environment 100. Other configurations of the imaging device 108, the environment 100, associated network connections, and other hardware, software, and service resources are possible.

The foregoing description is illustrative, and variations in configuration and implementation may occur to persons skilled in the art. For example, while embodiments have been described in which the system control module 110 operates to control one imaging device 108, in embodiments, the system control module 110 can be configured to control or operate multiple imaging devices or systems at one time. Similarly, while embodiments have been described in which one system control module 110 interacts with the imaging device 108, in embodiments, the logic contained in system control module 110 can be provisioned across multiple local or remote control modules or services. Other resources described as singular or integrated can in embodiments be plural or distributed, and resources described as multiple or distributed can in embodiments be combined.

In various embodiments, the systems and methods of the present teachings may be implemented in a software program and applications written in conventional programming languages such as C, C++, etc.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The embodiments, described herein, also relate to a device or an apparatus for performing these operations. The systems and methods described herein can be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical, FLASH memory and non-optical data storage devices. The computer readable medium can also be distributed over a network coupled computer systems so that the computer readable code is stored and executed in a distributed fashion.

The scope of the present teachings is accordingly intended to be limited only by the following claims.

What is claimed is:

1. An imaging system, comprising:
a chamber having a set of first predetermined environmental settings, the set of first predetermined environmental settings comprising at least one of: a temperature of the chamber, a humidity of the chamber, a pressure of the chamber, or a concentration of gas within the chamber;
an imaging device for imaging a sample within the chamber, the imaging device having a set of imaging parameters, the set of imaging parameters comprising at least one of: a magnification setting, a focal length setting, a resolution setting, an illumination setting, a monochrome setting, a color setting, a fluorescent stain setting, a transparency setting, or a phase setting;
a system controller operatively connected to the chamber and the imaging device and configured to
(i) operate the imaging device to perform an image capture event over time,
(ii) at a predetermined point during the image capture event, automatically change at least one environmental setting within the set of first predetermined environmental settings to a second predetermined environmental setting, the second predetermined environmental setting being different from the first predetermined environmental setting, and
(iii) adjust one or more control elements of the chamber to implement the second predetermined environmental setting within the chamber; and
a user interface communicatively connected to the system controller, the user interface being configured for receiving user input, the user interface including one or more user-selectable objects that enable configuration of the image capture event and that enable entry of the set of first predetermined environmental settings and entry of the at least one second predetermined environmental setting.

2. The imaging system of claim 1, wherein the chamber comprises a sealed chamber enclosing a sample plate.

3. The imaging system of claim 1, wherein the imaging device comprises a microscope.

4. The imaging system of claim 3, wherein the microscope comprises a digital imaging microscope.

5. An imaging system, comprising:
one or more processors; and
one or more hardware storage devices having stored thereon computer readable media that, when executed by the one or more processors, configure the imaging system to:
initiate a system controller operatively connected to a chamber and to an imaging device, wherein a user interface is communicatively coupled to the system controller, the user interface being configured for receiving user input;
receive, at the system controller by way of one or more user-selectable objects of the user interface, a set of initial environmental settings for the chamber, the set of initial environmental settings comprising at least one of a temperature of the chamber, a humidity of the chamber, a pressure of the chamber, or a concentration of gas within the chamber;

receive, at the system controller by way of one or more user-selectable objects of the user interface, a set of initial imaging parameters for operating the imaging device during an image capture event over a predetermined time period, the set of initial imaging parameters comprising at least one of a magnification setting, a focal length setting, a resolution setting, an illumination setting, a monochrome setting, a color setting, a fluorescent stain setting, a transparency setting, or a phase setting;

initiate, via the system controller, the set of initial environmental settings at the chamber and the set of initial imaging parameters to operate the imaging device and perform the image capture event;

receive, at the system controller by way of one or more user-selectable objects of the user interface, a set of changed environmental settings to be automatically implemented at a predetermined point during the image capture event, the changed environmental settings being different from the initial environmental settings; and upon reaching the predetermined point during the image capture event, automatically and dynamically update the set of initial environmental settings to the set of changed environmental settings, wherein the set of changed environmental settings comprises at least one of a changed temperature of the chamber, a changed humidity of the chamber, a changed pressure of the chamber, or a changed concentration of gas within the chamber.

6. The imaging system of claim 5, wherein the computer readable media further configure the imaging system to introduce or regulate, via the system controller, one or more reagents, growth factors, or other adjuvants for stimulating or modifying a growth of a sample within the chamber.

7. The imaging system of claim 6, wherein the imaging system introduces or regulates, via the system controller, the one or more reagents, growth factors, or other adjuvants at the predetermined point during the image capture event.

8. The imaging system of claim 5, wherein the computer readable media further configure the imaging system to change one or more imaging parameters of the set of initial imaging parameters by introducing a changed illumination setting, the changed illumination setting comprising a changed illumination type or a changed illumination intensity.

9. A method, comprising:
invoking a system controller operatively connected to a chamber and an imaging device, wherein a user interface is communicatively coupled to the system controller, the user interface being configured for receiving user input;

receiving, at the system controller by way of one or more user-selectable objects of the user interface, a set of initial environmental settings associated with physical conditions of the chamber, and initiating, via the system controller, the set of initial environmental settings associated with physical conditions of the chamber;

receiving, at the system controller by way of one or more user-selectable objects of the user interface, a set of initial imaging parameters associated with operation of the imaging device, the set of initial imaging parameters including instructions for performing an image capture event over a predetermined time period, and initiating, via the system controller, the set of initial imaging parameters associated with operation of the imaging device;

at a predetermined time point during the image capture event, initiating, via the system controller, a change from the set of initial environmental settings to a set of changed environmental settings, wherein initiating the change comprises introducing or regulating, via the system controller, one or more reagents, growth factors, or other adjuvants for stimulating or modifying a growth of a sample within the chamber;

in response to executing the change to the set of changed environmental settings, dynamically updating the set of initial imaging parameters to a set of changed imaging parameters; and capturing media from the image capture event, via the imaging device.

10. The method of claim 9, wherein the set of initial environmental settings comprises at least one of a temperature of the chamber, a humidity of the chamber, a pressure of the chamber, or a concentration of gas within the chamber, and wherein the set of changed environmental settings further comprises at least one of a changed temperature of the chamber, a changed humidity of the chamber, a changed pressure of the chamber, or a changed concentration of gas within the chamber.

11. The method of claim 9, wherein the set of initial imaging parameters comprises at least one of a magnification setting, a focal length setting, a resolution setting, an illumination setting, a monochrome setting, a color setting, a fluorescent stain setting, a transparency setting, or a phase setting, and wherein the set of changed imaging parameters comprises at least one of a changed magnification setting, a changed focal length setting, a changed resolution setting, a changed illumination setting, a changed monochrome setting, a changed color setting, a changed fluorescent stain setting, a changed transparency setting, or a changed phase setting.

12. The method of claim 9, wherein the image capture event comprises a video capture of contents of the chamber.

13. The method of claim 12, wherein the video capture comprises a time-lapse video capture.

14. The method of claim 12, wherein one or more of the set of changed imaging parameters or the set of changed environmental settings are recorded in a textual strip located at the bottom of the frames comprising the video capture.

15. The method of claim 9, wherein one or more of the set of changed imaging parameters or the set of changed environmental settings are recorded in the captured media for the image capture event.

16. The imaging system of claim 5, wherein the computer-readable media further configure the imaging system to:
receive, at the system controller by way of one or more user-selectable objects of the user interface, a set of changed imaging parameters; and dynamically update the set of initial imaging parameters to the set of changed imaging parameters, wherein the set of changed imaging parameters comprises at least one of a changed magnification setting, a changed focal length setting, a changed resolution setting, a changed illumination setting, a changed monochrome setting, a changed color setting, a changed fluorescent stain setting, a changed transparency setting, or a changed phase setting.

17. The imaging system of claim 1, wherein the user interface further comprises one or more user-selectable objects that enable entry of the set of imaging parameters.

18. The imaging system of claim 1, wherein the at least one environmental setting changed to a second predetermined environmental setting at the predetermined point during the image capture event comprises a pressure setting or a gas concentration setting.

\* \* \* \* \*